UNITED STATES PATENT OFFICE.

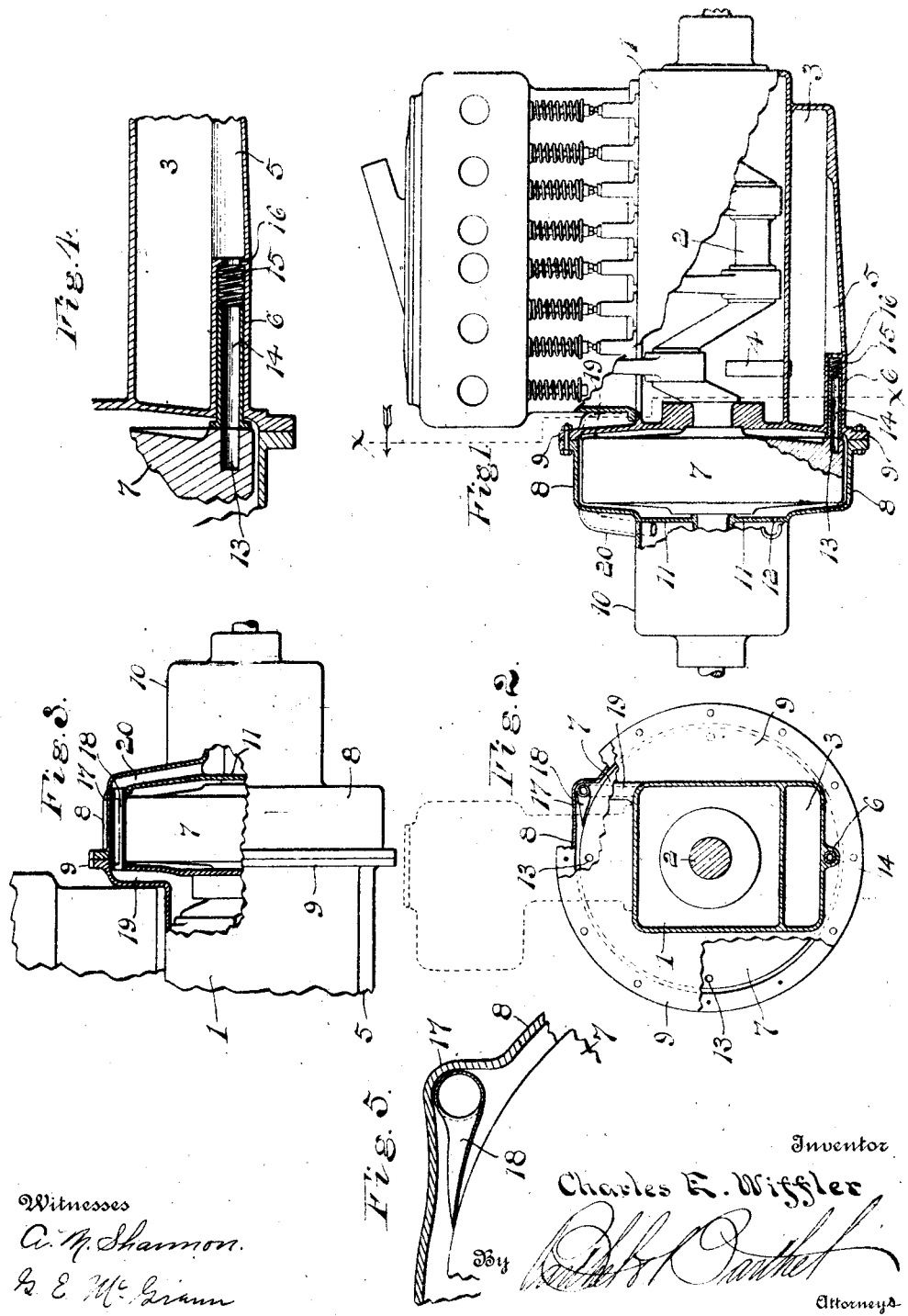

CHARLES E. WIFFLER, OF DETROIT, MICHIGAN.

OILING SYSTEM.

1,046,524. Specification of Letters Patent. Patented Dec. 10, 1912.

Application filed January 17, 1910. Serial No. 538,345.

*To all whom it may concern:*

Be it known that I, CHARLES E. WIFFLER, a citizen of the United States of America, residing at Detroit, in the county of Wayne and State of Michigan, have invented certain new and useful Improvements in Oiling Systems, of which the following is a specification, reference being had therein to the accompanying drawings.

This invention relates to an oiling system for maintaining a constant level of oil in the crank case of engines employing the splash system of lubrication and also for maintaining a constant level of oil in the casing of the power transmitting mechanism where such mechanism forms a part of a unitary power plant, and the object of the invention is to provide simple and efficient means for feeding measured quantities of oil to the crank case or transmission casing in timed relation to the speed of the engine, utilizing for such purpose a rotatable member of the engine and thereby obviating the necessity for auxiliary pumps, or other means for elevating the oil, and further, to provide certain new and useful features in the construction, arrangement and combination of parts, all as will be hereinafter more fully described, reference being had to the accompanying drawings in which, Figure 1 is a side elevation of an engine embodying the invention with parts broken away to show the construction; Fig. 2 is a transverse section of the same substantially on the line x—x of Fig. 1, with parts broken away to show the construction; Fig. 3 is a detail showing a portion of the engine in side elevation with parts broken away to show the construction; Fig. 4 is an enlarged sectional detail of the delivery tube or valve and adjacent parts; and Fig. 5 is a sectional detail showing the scraper.

For convenience of illustration the invention is shown as applied to a four-cylinder internal combustion engine but it will be understood that the same may be applied as well to other types or classes of engines employing the splash system of lubrication in which it is essential in order to secure the best results, to maintain the oil in the crank case at a certain level. A casing for a power transmission mechanism is also shown as forming a part of the power plant which is especially designed for automobiles, but it is obvious that the invention may be used in other constructions having a transmission casing adapted to contain oil and in which casing it is desirable to maintain an oil level to insure the efficient lubrication of the parts.

Referring to the drawings 1 represents a closed crank case of an engine within which the crank shaft 2 turns and is mounted in the usual manner. Formed integral with the bottom or lower side of the crank case 1 is an oil chamber 3 into which the oil from the crank case may overflow when it reaches a level above the upper end of a stand pipe 4 extending through the bottom of the crank case into the chamber and upward within the crank case to the height at which it is found desirable to maintain a level of oil in order that the most efficient oiling of the bearings and cylinders may be secured.

The greater the speed of the engine the more oil will be consumed in the bearings and will be splashed into the stand pipe and flow into the chamber 3. It is therefore desirable to feed into the crank case quantities of oil in proportion to the speed at which the engine is running so that at all speeds and at all times the desired level of oil will be maintained in the crank case. The chamber 3 is utilized as an auxiliary supply tank and if a surplusage of oil is put into the crank case, it will simply flow back into this supply chamber through the stand pipe 4.

On the bottom of the chamber 3 is formed a duct 5 by casting a hollow projection or rib upon the bottom of the chamber and this duct is tapered toward the forward end of the chamber and at its rear end is formed into a tubular portion 6 open at its forward end into the tapering portion of the duct which tapering portion is open at its upper side to receive oil from the chamber.

On the crank shaft 2 adjacent to the rear end of the crank case is secured a fly wheel 7 of any suitable form and construction and inclosing the fly wheel is a casing 8 which is bolted to a disk 9 formed integral with the end of the crank case, said disk forming the forward end of the casing. The said casing is extended rearwardly, forming an inclosing casing 10 for a transmission mechanism (not shown), the interior of which casing is separated from the interior of the fly wheel casing 8, by a vertical wall 11 in which is a small hole 12 through which the oil in the transmission casing may overflow back into the fly wheel casing, said hole being at such a distance from the bottom of the casing 10 that the desired quantity of oil will be maintained in said casing.

In the forward side of the fly wheel 7 near its periphery are one or more holes 13 forming pockets to receive oil from the rear end of the duct 5, the oil being delivered to these pockets as the fly wheel revolves, by a tube 14 slidable longitudinally within the tubular portion 6 of the duct with its rear end pressed against the fly wheel by a coiled spring 15 inserted within the duct between the forward end of the tube and a ledge 16 extending into the duct from the wall thereof. The fly wheel is faced off at its forward side so that the end of the tube 14 will fit closely against the same and form a valve to prevent the escape of oil from the tube except when one of the pockets is brought into registry with the end of the tube as the wheel is turned. The contact end of the tube is enlarged or flanged as shown in Fig. 4 so that if the wheel should come to rest with one of the pockets partially over the end of the tube, the flange will prevent the escape of oil from the tube into the fly wheel casing.

When one of the pockets 13 is brought into alinement with the end of the tube it will receive a certain quantity of oil from said tube and will carry the oil upward therefrom the oil escaping from the pocket and being carried by centrifugal force around and upon the periphery or outer face of the fly wheel as the wheel is turned rapidly. At the upper side of the fly wheel the casing 8 is enlarged or formed with a chamber 17 to receive a pivoted flap or scraper 18 adapted to engage and ride freely upon the face of the fly wheel and to scrape or pick up from said face the oil which has been carried up thereon from the delivery tube 14. Leading from one end of the scraper 18 is a passage 19 which opens into the top of the crank case 1 and thus the oil picked up by the scraper is conducted into the top of the crank case to replenish the same. This passage 19 may be formed in the disk 9 as shown or it may be a separate tube or pipe if desired. Leading from the opposite end of the scraper, is a passage 20 which may be formed in the casing as shown or otherwise arranged to conduct part of the oil from the scraper into the top of the transmission casing 10 where it will settle to the bottom thereof and maintain a level of oil therein, any surplusage flowing through the hole 12 into the fly wheel casing where it will be again picked up by the face of said wheel and delivered to the scraper.

The pockets 13, any desired number of which may be used, form measuring devices to receive certain quantities of oil from the supply chamber 3 and deliver the same to the scraper at the upper side of the fly wheel. The greater the speed of the engine the faster the fly wheel will be turned and the greater will be the frequency of the reception and discharge of oil from these pockets. Measured quantities of oil will, therefore, be delivered into the crank case and transmission casing at a frequency proportionate to the speed of the engine and sufficient oil, no matter what the speed of the engine may be, will always be delivered to said casings to maintain the proper level of oil therein.

Having thus fully described my invention what I claim is:—

1. The combination with an engine, of a rotatable member, a casing adjacent to said rotatable member adapted to contain oil, an oil supply chamber, a valve to control the discharge of oil from said chamber to the rotatable member, and means for conducting oil elevated by the rotatable member, into said casing.

2. The combination with an engine having a closed crank case, of a fly wheel for the engine, a casing for the fly wheel, a casing for a transmission mechanism, said transmission casing and said crank case being adapted to contain oil and said fly wheel casing being adapted to receive the overflow of oil from said crank case and transmission case, and means for conducting to the crank case the transmission casing oil carried up upon the periphery of the fly wheel.

3. The combination with an engine, of a fly wheel for the engine having a pocket, an oil supply chamber adapted to deliver oil to the pocket in the fly wheel at the lower side of said wheel, a chamber adapted to contain a level of oil, and means for conducting oil from the upper side of the fly wheel to said chamber.

4. The combination with an engine having a closed crank case, of means for maintaining a level of oil in said crank case, an oil chamber adapted to receive an overflow of oil from the crank case, a fly wheel for the engine, a casing for the fly wheel, means for controlling the delivery of oil from the oil chamber into the lower side of the casing for the fly wheel, and means for conducting oil from the upper side of the fly wheel casing to the crank case.

5. The combination with an engine, of a rotatable member, a casing adapted to contain a level of oil, an oil supply chamber, a member abutting said rotary member and having an oil passage to deliver oil from the supply chamber to the rotatable member, and means for conducting oil from the rotatable member to the casing.

6. The combination with an engine, of a fly wheel for the engine having a pocket, a casing adjacent to the fly wheel adapted to contain oil, an oil supply chamber, a member engaging the fly wheel and having a passage adapted to register with the pocket in the fly wheel to conduct oil to said pocket from the supply chamber, and means for removing and conducting to said casing the oil delivered to the fly wheel and carried upward thereby.

7. The combination with an engine of a fly wheel for the engine, a casing for the fly wheel, a casing adjacent to the fly wheel casing adapted to contain a quantity of oil, an oil supply chamber adapted to receive an overflow of oil from said casing, means for delivering and controlling the delivery of oil from the supply chamber into the lower part of the fly wheel casing, and means in the upper part of the fly wheel casing for removing oil from the periphery of the fly wheel and conducting the same to the said oil containing casing.

8. The combination with an engine having a closed crank case, an oil supply chamber below the crank case, a fly wheel for the engine, a casing for the fly wheel adjacent to the end of the crank case and chamber, means controlling the escape of oil from said chamber into said fly wheel casing, means engaging the face of the fly wheel at the upper side of its casing to remove oil therefrom, and means for conducting the oil so removed, into the top of the crank case.

9. The combination with an engine, of a fly wheel for said engine, a casing for the fly wheel, a casing adapted to contain a level of oil, means controlling the admission of oil to the lower part of the fly wheel casing from said oil containing casing, a scraper to remove oil carried up on the periphery of the fly wheel, and means for conducting the oil from said scraper into the said oil containing casing.

10. The combination with an engine having a closed crank casing, of an oil chamber below the crank case, a fly wheel for the engine having a pocket, a member engaging the fly wheel and having a passage adapted to register with the pocket in the fly wheel and communicating with the interior of the oil chamber, a spring to yieldingly press said member against the fly wheel, and means at the upper side of the fly wheel for removing the oil carried up by the pocket therein.

11. The combination with an engine, having a closed crank case, of an oil chamber below the crank case, a fly wheel for the engine having a pocket, a casing for the fly wheel, a tubular member abutting the fly wheel and registering with the pocket therein, said tubular member forming a passage for oil from the oil chamber, means for yieldingly pressing the tubular member against the fly wheel, and means for conducting oil from the upper side of the fly wheel into the crank case.

12. The combination with an engine having a closed crank case, of an oil chamber below the crank case formed with a tubular passage at its lower side, an overflow pipe in the crank case communicating with the oil chamber, a fly wheel for the engine having a pocket, a casing for the fly wheel, a tube in the tubular passage of the oil chamber, a spring to yieldingly press the end of the tube against the fly wheel, and means in the upper part of the fly wheel casing for removing oil from the face of the fly wheel and conducting the same into the crank case.

13. The combination with an engine having a closed crank casing, an oil chamber formed integral with the crank case below the same, a fly wheel for the engine having pockets, a casing for the fly wheel at the end of the crank case, a casing for the transmission mechanism adjacent to the fly wheel casing, means for discharging oil from the transmission casing into the fly wheel casing, an oil passage leading from the oil chamber into the lower part of the fly wheel casing, means in said passage for controlling the discharge of oil therethrough, means in the upper part of the fly wheel casing for removing oil from the face of the fly wheel and conduits leading from said means to said crank case and transmission casing.

14. The combination with an engine, of a closed crank case for said engine, an oil chamber formed integral with the lower side of the crank case, a fly wheel for the engine, a casing for the fly wheel, a casing for a transmission mechanism, formed integral with the fly wheel casing, a wall dividing the interior of the transmission casing from the interior of the fly wheel casing and provided with an overflow opening, an overflow pipe in the crank case opening into the oil chamber, means controlling the passage of oil from the oil chamber into the lower part of the fly wheel casing, means in the upper part of the fly wheel casing to remove oil from the face of the fly wheel, and conduits leading from said means into the crank case and transmission casing.

In testimony whereof I affix my signature in presence of two witnesses.

CHARLES E. WIFFLER.

Witnesses:
LEWIS E. FLANDERS,
OTTO F. BARTHEL.